(12) United States Patent
Logel et al.

(10) Patent No.: US 8,006,368 B2
(45) Date of Patent: Aug. 30, 2011

(54) PROCESS AND APPARATUS FOR MAKING AN INJECTION MOLDED VIAL

(75) Inventors: Valere Logel, Levallois Perret (FR); Christian Meyer, Millancay (FR); Thierry Carracillo, Argent S/Sauldre (FR)

(73) Assignee: AIRSEC, Choisy le Roi (FR)

( * ) Notice: Subject to any disclaimer, the term of this patent is extended or adjusted under 35 U.S.C. 154(b) by 881 days.

(21) Appl. No.: 12/024,691

(22) Filed: Feb. 1, 2008

(65) Prior Publication Data

US 2009/0194904 A1    Aug. 6, 2009

(51) Int. Cl.
*B21B 1/46* (2006.01)
*B28B 5/00* (2006.01)

(52) U.S. Cl. ........ 29/527.1; 264/250
(58) Field of Classification Search .......... 29/527.1, 29/527.2, 469, 453, 458, 428, 422, 801, 705, 29/721; 264/250; 206/204, 459.1
See application file for complete search history.

(56) References Cited

U.S. PATENT DOCUMENTS

| | | |
|---|---|---|
| 4,783,056 A | 11/1988 | Abrams |
| 4,812,116 A | 3/1989 | Abrams |
| 6,303,064 B1 | 10/2001 | Abrams |
| RE37,676 E | 4/2002 | Abrams |
| 7,665,601 B2 * | 2/2010 | Portier ............. 206/204 |
| 2011/0000930 A1 * | 1/2011 | Logel et al. .......... 220/849 |

* cited by examiner

*Primary Examiner* — John C Hong
(74) *Attorney, Agent, or Firm* — Scott R. Cox

(57) ABSTRACT

A process for forming a vial consisting of a tube, an insert secured within the tube, and a cap secured to the tube, which includes injection molding of the insert, removing the insert from the injection molding machine and placing it over a pin on a moving pallet by use of a manipulator, injection molding of the tube by a separate injection molding machine and moving the injection molded tube to a position where it is placed over the insert on the moving pallet by use of a manipulator, wherein a cap for the tube is formed at a separate injection molding machine where the cap is secured to the tube, wherein the joined tube with insert and cap are moved to a cap closing station wherein, after closing of the cap onto the tube, the assembled vial is inspected, tested and packaged.

18 Claims, 2 Drawing Sheets

PROCESS AND APPARATUS FOR MAKING AN INJECTION MOLDED VIAL

BACKGROUND OF INVENTION

One embodiment of the invention relates to an apparatus used for forming a leak proof vial, which vial includes a body into which an insert is placed and a separate cap, which is secured to the body of the vial. Another embodiment of the invention relates to a process for the formation of the vial with these components.

Plastic tubes with caps are known in the industry. These tubes with caps are generally formed in a single injection molding machine, whereby the cap and tube are integrally formed in a single injection molding operation. Following formation, the injection molded vial is removed from the injection molding machine, the vial is cooled, the cap is closed onto the tube, and the closed vial is then packaged and shipped. Processes for formation of such vials containing a tube and cap are disclosed, for example, in U.S. Pat. Nos. 4,783,056, 4,812,116, U.S. Pat. No. 5,723,085, now RE 37676, and U.S. Pat. No. 6,303,064. These patents also disclose various processes for the formation of vials wherein the tube and cap are integrally formed.

An important criteria for such vials is that they be air tight in order to protect products contained in the vials. To achieve such air tightness requires a very precise manufacturing process for the vials, in particular for those portions of the vial that are closed upon each other. In prior art processes, the reliability of vials could not be guaranteed due to manufacturing defects in these sealed portions of the vials.

As a result of these disadvantages, one object of an embodiment of this invention is to describe a production process which has improved reliability with regard to the tightness of the seal of the vials.

It is another object of one embodiment of the invention to provide an improved vial with tube and non-integral cap that contains an insert, which insert absorbs gaseous compositions that are present in the environment, particularly moisture.

It is a further object of one embodiment of the invention to provide an apparatus for the production of a vial, wherein a separate and distinct, non-integral tube, cap and insert are formed.

It is a further object of one embodiment of the invention to provide an improved process for the production and formation of the improved tube with cap containing an insert, wherein the tube, cap and insert are non-integral, whereby each component is formed in a separate injection molding procedure.

It is understood that the foregoing detailed description is explanatory only and not restrictive of the invention.

SUMMARY OF THE INVENTION

In accordance with one embodiment of the invention, there is provided a process for the formation of a vial comprising a separately formed tube, a separately formed insert placed within the tube, and a separately formed cap, which is secured onto the tube, comprising injection molding of the insert, following introduction of insert material into injection molding machine A, partially ejecting the insert from injection molding machine A, removing the insert from injection molding machine A by use of manipulator A1 and placing it on a moving pallet, injection molding of the tube, following introduction of tubular material into injection molding machine B, partially removing the tube from injection molding machine B, removing the injection molded tube from injection molding machine B by use of manipulator B1 and moving it to the moving pallet P1, wherein the tube is then forced over the insert, injection molding of the cap, following introduction of cap material into injection molding machine C, partially removing the injection molded cap from injection molding machine C, removing the injection molded cap from the injection molding machine C by use of manipulator C1 and transporting the cap to a location where the cap is to be connected to the tube, connecting the cap to the combination tube and insert, closing the cap onto the tube to form a closed vial, and packaging the closed vial.

A further embodiment of the invention comprises completely inserting the insert into the tube after the tube is placed over the insert.

A further embodiment of the invention comprises removing the assembled tube with insert from the moving pallet P1 prior to connecting the cap onto the tube with insert.

A further embodiment of the invention comprises removing the joined tube with cap connected onto the tube to a cap closing station by use of manipulator D1.

A further embodiment of the invention comprises testing the closed vial for leakage prior to packaging of the vials.

A further embodiment of the invention comprises simultaneous formation of multiple inserts within injection molding machine A and/or simultaneous formation of multiple tubes within injection molding machine B and/or simultaneous formation of multiple caps within injection molding machine C.

A further embodiment of the invention comprises formation of the insert within injection molding machine A, wherein the insert is produced from a combination of a desiccant and a polymer, which components are blended together after introduction into injection molding machine A.

A further embodiment of the invention comprises the formation of the insert, tube and cap of a vial in any order or sequence of manufacture.

DETAILED DESCRIPTION OF AN EMBODIMENT OF THE INVENTION

Figure 1:
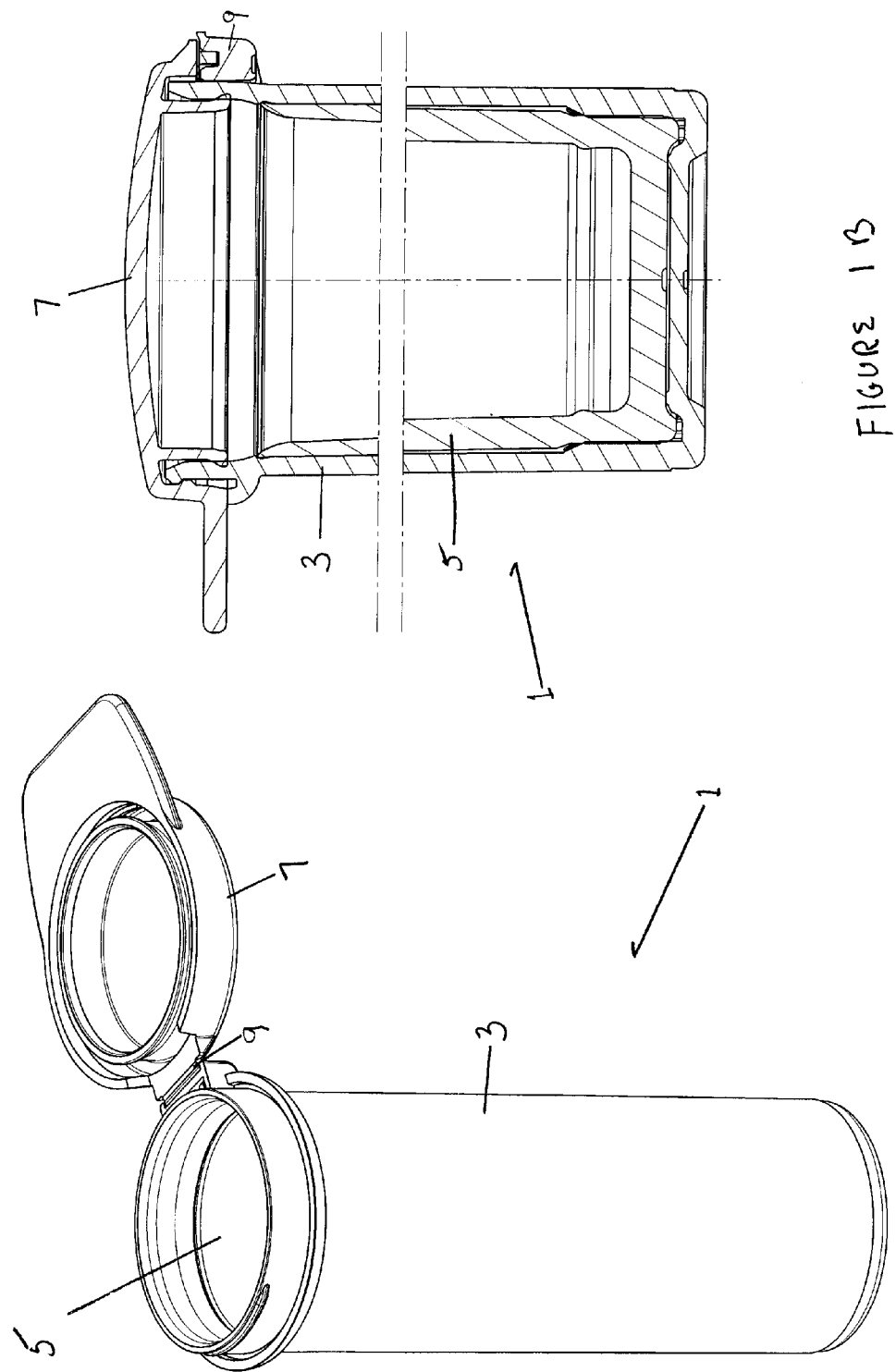
FIGS. 1A and 1B show the tube, insert and cap of the formed vial in perspective view (FIG. 1A) and in a side cut away view (FIG. 1B).

The present invention includes a process and apparatus for making a leak proof vial (1), which vial comprises a tube (3) with separately formed insert (5) placed within the tube (3) and a separately formed cap (7) fitted onto the tube (3). See FIGS. 1A and 1B.

The apparatus and process of the present invention can be used to make a variety of different types of containers, including bottles and vials and any other container requiring a leak proof seal for the cap onto the container. The components of the invention enhance the quality and reliability of the seal between the cap (7) and the tube (3).

The invention will be described in the drawings in respect to a vial (1) comprising a tube (3) containing an insert (5) and a cap (7), which is fitted onto the tube (3). The vial (1) of the invention is not limited to cylindrical shaped vials, although the particular embodiment disclosed herein is a cylindrical vial, that can be used for holding products which are sensitive to moisture, such as pharmaceutical, neutraceutical or medical products.

As an example, the vial (1) as shown in FIGS. 1A and 1B is cylindrical in shape with an integrally formed bottom. Introduced completely within this tube (3) is the insert (5). The general shape of the insert is cylindrical, which in one preferred embodiment is open at the bottom and top. Secured to the open end of the tube (3) is the cap (7) which, when closed onto the tube, forms a leak proof seal around the lip of the vial. In a preferred embodiment the cap (7), when formed, is not integrally connected to the tube, but rather is joined to the tube by a hinge (9), wherein the combination of the cap (7) and tube (3) forms the hinge (9) between the tube (3) and the cap (7). Preferably, the cap (7) is circular in shape and has a cylindrical inner wall and a cylindrical outer wall wherein the inner wall is provided with a sealing portion at the outer edge of the inner wall wherein the vertical position of an apex of the sealing portion is smaller than the vertical height of the outer wall as shown in FIGS. 1A and 1B. Since the sealing portion is provided at the outer edge of the inner wall and the vertical position of an apex of the sealing portion is smaller than the vertical height of the outer wall, the sealing portion is protected against damage by undesired contact with the outer wall. This increases air tightness of the vial and overall reliability due to fail safe handling (the sealing line is arranged within a very narrow groove formed between inner and outer wall, such that it is very unlikely that the sealing line can be contacted or damaged).

While the tube (3) and cap (7) are produced from conventional plastic or thermoplastic materials, preferably polyethylene, or polypropylene, in a preferred embodiment, the insert (5) is produced from a combination of an absorbent material, preferably a moisture absorbent material, such as a desiccant material, blended with a polymeric material, which when cooled forms a solid cylindrical insert, which fits securely within the tube (3). In a preferred embodiment the composition of the insert (5) comprises 40% to 85% of a desiccant material, preferably a molecular sieve, blended with from about 60 to about 15% of a plastic material, preferably polypropylene, polyethylene or polystyrene. In one embodiment these materials are mixed together prior to being introduced into an injection molding machine. However, in a more preferred embodiment, the components are mixed together after introduction into an in mold compounder injection molding machine, which forms the insert (5). Combining the materials within the preferred in mold compounder injection molding machine reduces the risk of moisture uptake by the desiccant material component of the insert, such as can occur if it is added at a separate stage of the processing prior to introduction of the separate components of the insert into the injection molding machine.

The tube (3), cap (7) and insert (5) can be formed by any conventional forming procedure utilized to form plastic or polymeric materials. Preferably, the tube (3), cap (7) and insert (5) are each formed separately in separate injection molding machines. In this embodiment the material utilized to form each of the tube (3), insert (5) and cap (7) is introduced separately into each of three injection molding machines. The order of formation of the separate components is not critical. In a preferred embodiment each injection molding machine contains multiple cavities for molding multiple components of the vial at the same time, preferably at least eight (8) cavities with each machine. Each of the three injection molding machines operates separately to form one of the three components of the vial (1). By use of separate injection molding machines, the composition of the tube (3), insert (5), and cap (7) may be varied, if desired, thereby allowing the use of different materials for each component. Separate injection molding machines also permit differences in color or other characteristics, such as soft or hard materials, to be utilized for each component of the vial. Separate injection molding machines also maximize the volume of each component that can be produced by each injection molding machine during each production cycle. The use of separate injection molding machines permits the order of formation of the separate components to be controlled, if necessary.

In addition, in prior art processes when a cap closing system is present within, or adjacent to, an injection molding machine, the maximum number of cavities that can be present in the machine is reduced. The current process permits use of an optimal number of cavities and an optimal number of molding machines, thereby increasing the reliability of the production process.

Figure 2:
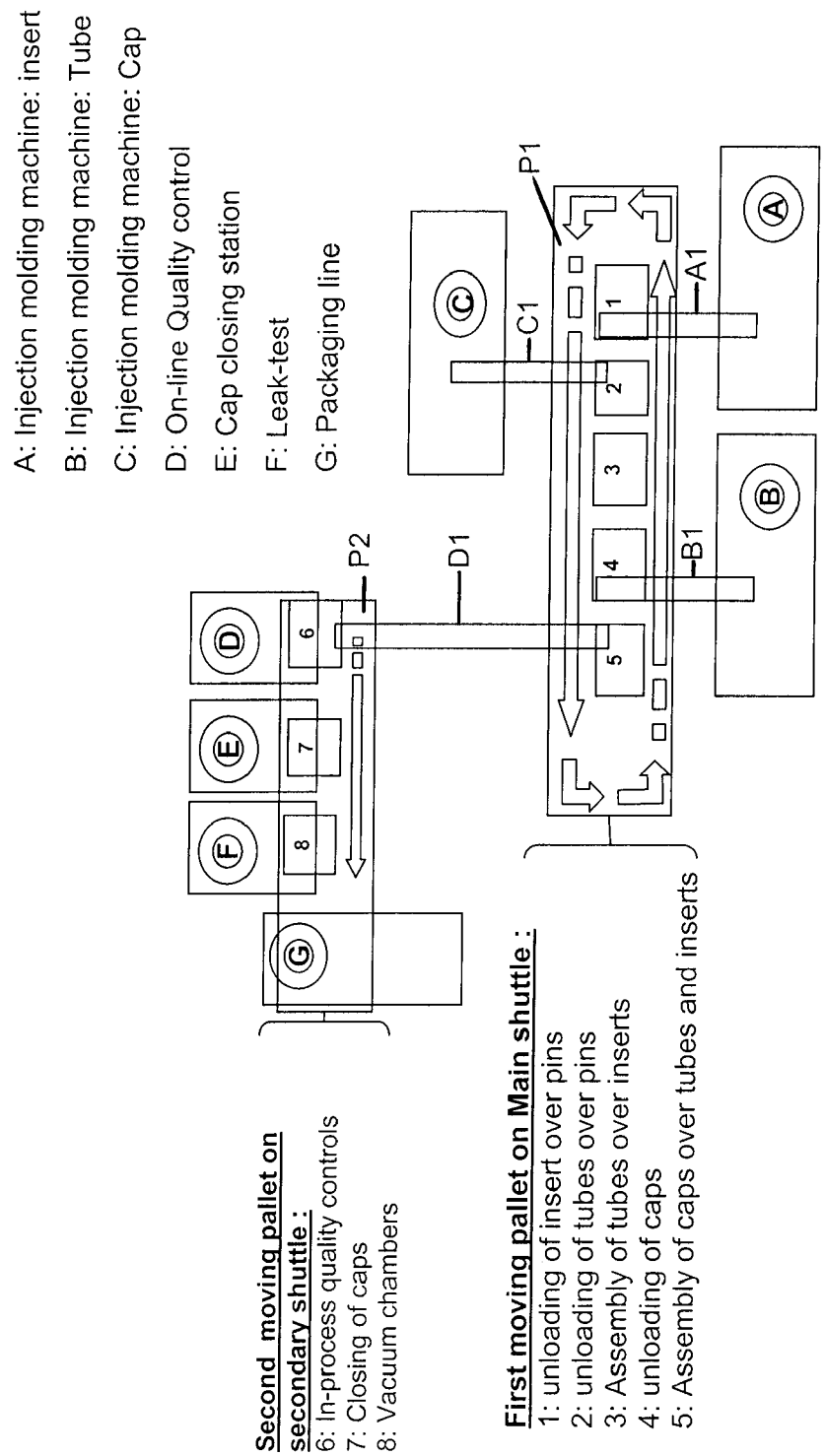
FIG. 2 is a schematic view of the process utilized to produce the improved vial of the invention.

In a preferred embodiment for the process for the formation of the vial, a continuous process is used whereby each component is separately formed and then joined during the process of formation of the vial, as shown in FIG. 2.

In a preferred embodiment, the insert (5) is formed by injection molding machine A, wherein the desired materials to be used for formation of the insert are preferably introduced separately into injection molding machine A, and then mixed. Using conventional injection molding procedures, injection molding machine A produces the insert. In one preferred embodiment, injection molding machine A is an injection molding compounder produced by KraussMaffei GmbH of Munich, Germany.

Following the formation of the insert (5), the insert is partially removed from the injection molding machine. Thereafter, manipulator A1 removes the insert from injection molding machine A and moves the insert to a moving pallet P1. Manipulator A1 preferably comprises a conventional robotic arm, containing a gripping component which grips the insert and moves it to the moving pallet P1. In a preferred embodiment the moving pallet P1 is driven by a continuous belt-driven system containing a series of pins (not shown) onto which the formed inserts are placed.

At a separate work station, plastic material, preferably polyethylene, polypropylene or polystyrene, which is used for forming the tube (3), is introduced into injection molding machine B and the tube (3) is injection molded. The injection molded tube is then partially ejected from injection molding machine B, where it is grabbed by a gripping element of the robotic arm of manipulator B1, which then removes the tube entirely from injection molding machine B and transports the formed tube to the moving pallet P1. Injection molding machine B and manipulator B1 can be similar equipment to injection molding machine A and manipulator A1.

In the meantime, the moving pallet P has moved the inserts on pins from a first location, where the inserts were first placed onto the pins by manipulator A1, to a second location where manipulator B1 places the tube (3) over the insert (5). The moving pallet P1 then moves the tubes and inserts to an assembly station, (station 3 on Ex. 2) where the tubes are forced completely over the inserts, so that the insert is located entirely within the tube.

At another work station, the cap (7) is injection molded using injection molding machine C. Injection molding machine C is similar in design to injection molding machines B and A. Following the formation of the cap, it is partially removed from injection molding machine C and then seized by a gripper element of the robotic arm of manipulator C1. Manipulator C1 is similar in design to manipulators A1 and B1. In the meantime, the tubes (3) with inserts (5) placed within the tubes are moved further along the moving pallet P.

Manipulator C1 removes the cap entirely from injection machine C and transports the formed cap to the moving pallet P1. The cap (7) is placed next to the tube (3) then the moving pallet moves to a separate assembly station where the cap (7) is joined with the already formed tube (3) with insert secured therein. (See station 5 on Ex. 2)

The insert, cap and tube are removed from their respective injection molding machine by use of manipulators. The components are not dropped from the injection molding machines, which dropping can result in damage to the components of the vial.

As previously stated, the tube and cap are separately formed and when joined together form a hinge (9) permitting the cap to move from a closed to an open position. By not initially closing the cap onto the tube, various quality control processes can be performed on the separately formed components prior to closing the vial. Further, by not immediately sealing the cap onto the tube, the surfaces of the separate components are not damaged from premature closing as the components cool.

Many different types of hinges can be formed from the connection between the tube and cap, all of which are within the scope of the invention. When the cap is joined with the combination tube and insert, the cap is in an open position on the tube.

Following the joining of the cap with the tube and insert to form the vial, the assembled vial (1) is preferably moved to a second moving pallet (P2) by means of manipulator D1. In a preferred embodiment, an in process quality control station 6 can be utilized prior to closing the cap over the tube. Dimensional control of the sealing surfaces can, for example, be examined at this stage. The assembled vial is then transferred to a cap closing station 7 wherein the assembled vial is held in place and the cap is closed onto the tube by use of a cap closing machine driven by a cylinder.

Following the closing of the cap onto the tube, the completed vial is inspected and tested for leakage by conventional procedures at a leak test station 8, such as by measuring the extent of decay in a vacuum in which the completed vial is placed. Any vials that do not pass this inspection are rejected. Completed vials, which have passed this inspection, are then removed from the cap closing station for packaging and shipment on packaging line G.

After the assembled vials are removed from the moving pallet, the pins on each moving pallet rotate under the moving pallet on the continuous belt to the beginning of the moving pallet to begin again the process for assembly of new vials.

While the invention has been described in detail with reference to specific embodiments thereof, it will be apparent to one skilled in the art that various changes and modifications can be made and equivalents employed without departing from the invention.

The invention claimed is:

1. A process for forming a leak proof container comprising,
    injection molding of an insert for the container after introduction of insert material into injection molding machine A,
    removing the insert from injection molding machine A and placing it on a moving pallet by use of a manipulator,
    injection molding of a tube of the container after introduction of tube material into injection molding machine B,
    following formation of the tube in injection molding machine B, partially ejecting the tube from injection molding machine B,
    removing the injection molded tube from injection molding machine B and moving that tube to the moving pallet by use of a manipulator,
    securing the tube over the insert while on the moving pallet,
    injection molding of a cap for the container after introduction of cap material into injection molding machine C,
    removing the injection molded cap from injection molding machine C by use of a manipulator,
    securing the cap onto the combination tube and insert,
    closing the cap onto the tube to form the completed container, and
    packaging the closed container.

2. The process of claim 1 wherein the composition of the insert comprises a desiccant material blended with a plastic material.

3. The process of claim 2 wherein the plastic material comprises a thermoplastic material selected from the group consisting of polyethylene and polypropylene.

4. The process of claim 2 wherein the desiccant material comprises a molecular sieve.

5. The process of claim 2 wherein the desiccant material and the plastic material used to form the insert are combined while present in injection molding machine A.

6. The process of claim 1 comprising a second moving pallet to assist in formation of the container.

7. The process of claim 1 wherein the manipulator comprises a robotic arm.

8. The process of claim 1 wherein following introduction of the insert onto a pin on the moving pallet, the moving pallet is moved to a second position wherein the tube is secured over the insert.

9. The process of claim 1 wherein the insert is introduced entirely within the tube on the moving pallet.

10. The process of claim 1 wherein following the insertion of the tube over the insert, the combined tube and insert is moved to a third location on the moving pallet.

11. The process of claim 1 wherein following securing of the tube over the insert, the moving pallet is moved to a new position where the cap is assembled with the tube and insert.

12. The process of claim 1 wherein following the formation of the cap in injection molding machine C, the cap is only partially removed from the injection molding machine C, and is removed from injection molding machine C only by use of a manipulator.

13. The process of claim 12 wherein the manipulator comprises a robotic arm that seizes the cap and transfers it to the moving pallet.

14. The process of claim 1 wherein the assembled cap with tube and insert is removed from the moving pallet and transferred to a cap closing station by means of a manipulator.

15. The process of claim 1 wherein after the closing of the cap onto the tube containing the insert, the closed container is tested for leakage.

16. The process of claim 1 wherein the moving pallet comprises a continually moving belt system, wherein the pallet rotates back to the beginning of the process after the tube with insert and cap is removed from the moving pallet.

17. The process of claim 1 wherein one or more of the injection molding machines contain multiple cavities for forming multiple components of multiple containers at the same time.

18. The process of claim 1 wherein the injection molding machine A forming the insert comprises an in mold compounder injection molding machine.

* * * * *